(12) United States Patent
Morita et al.

(10) Patent No.: US 7,293,878 B2
(45) Date of Patent: Nov. 13, 2007

(54) PROJECTOR HAVING AN IMAGE DISPLAY ELEMENT

(75) Inventors: Tatsuo Morita, Tokyo (JP); Mikio Shiraishi, Yokohama (JP); Tetsuki Nishimura, Yokohama (JP); Hideki Okuyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 10/964,631

(22) Filed: Oct. 15, 2004

(65) Prior Publication Data

US 2005/0162618 A1      Jul. 28, 2005

(30) Foreign Application Priority Data

Jan. 23, 2004   (JP)   ............................. 2004-015114
Aug. 27, 2004   (JP)   ............................. 2004-247710

(51) Int. Cl.
*G03B 21/26*   (2006.01)
*G03B 21/18*   (2006.01)

(52) U.S. Cl. ........................................................ 353/57

(58) Field of Classification Search .................. 353/57, 353/60, 61, 119; 362/257, 264, 294; 368/294
See application file for complete search history.

(56) References Cited

U.S. PATENT DOCUMENTS 4,925,295 A * 5/1990 Ogawa et al. ................. 353/57
6,637,895 B2 * 10/2003 Fujimori et al. ............ 353/119
2002/0064046 A1 * 5/2002 Davis et al. ................. 362/294
2002/0141188 A1 * 10/2002 Basey ......................... 362/294

FOREIGN PATENT DOCUMENTS

| JP | 08-262573 | 10/1996 |
|---|---|---|
| JP | 10-027518 | 1/1998 |
| JP | 2002-189247 | 7/2002 |

* cited by examiner

*Primary Examiner*—W. B. Perkey
*Assistant Examiner*—Robert Do
(74) *Attorney, Agent, or Firm*—Antonelli, Terry, Stout & Kraus, LLP.

(57) ABSTRACT

A projector having an image display element for modulating light on the basis of an image signal and a projection lens for projecting light emitted from the image display element on a screen, includes: a lamp which has a light emitting source for emitting light; a reflector which reflects light emitted from the light emitting source; a cover glass which covers an emission surface of light from the reflector; a cooling fan disposed outside the reflector; and an air direction changing unit which changes a direction of cooling air caused by the cooling fan. The air direction changing unit is disposed within a space surrounded by the reflector and the cover glass, and outside an emitted light path of light reflected by the reflector. Cooling air within the space is exhausted outside the projector through the cooling fan.

11 Claims, 10 Drawing Sheets

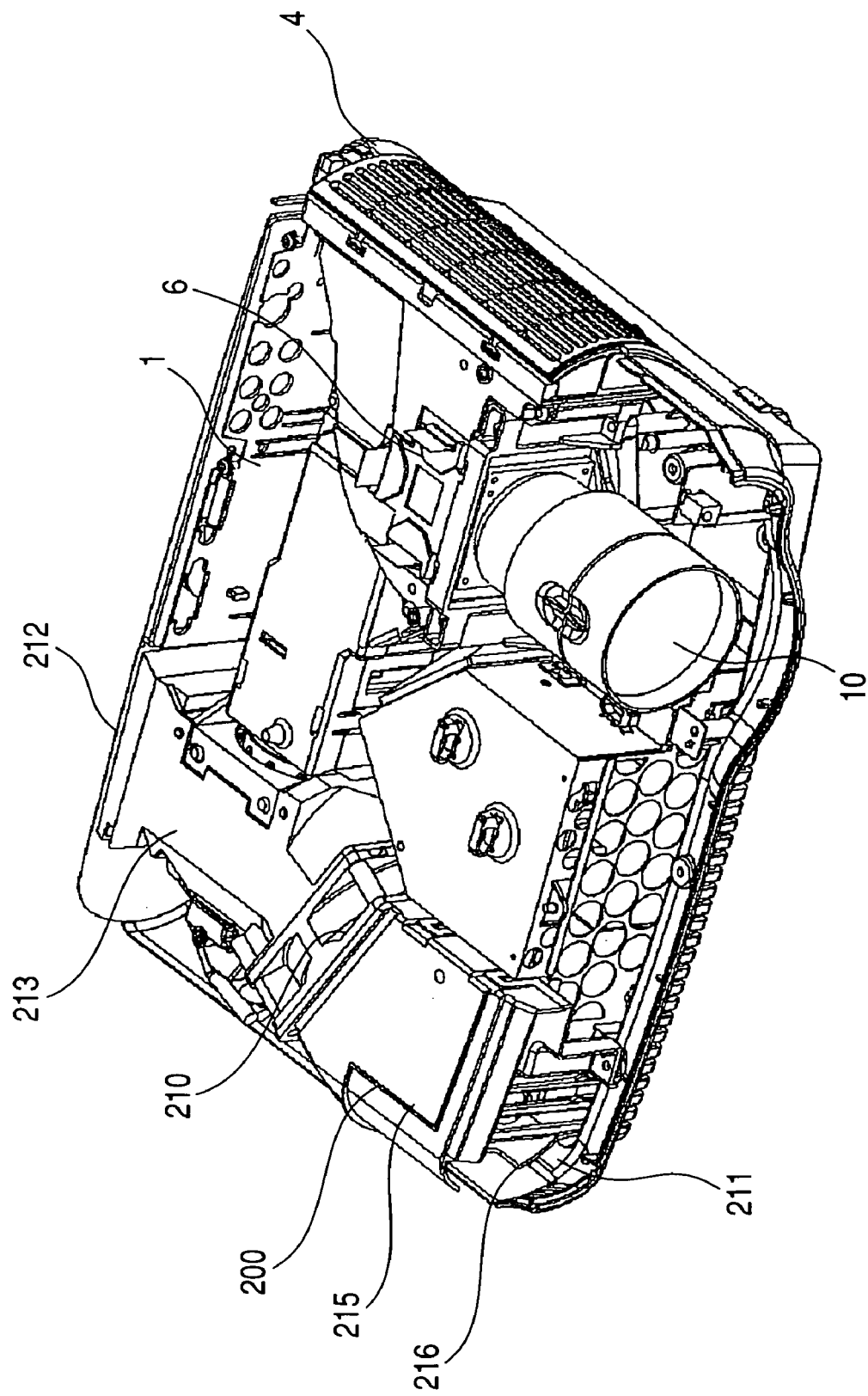

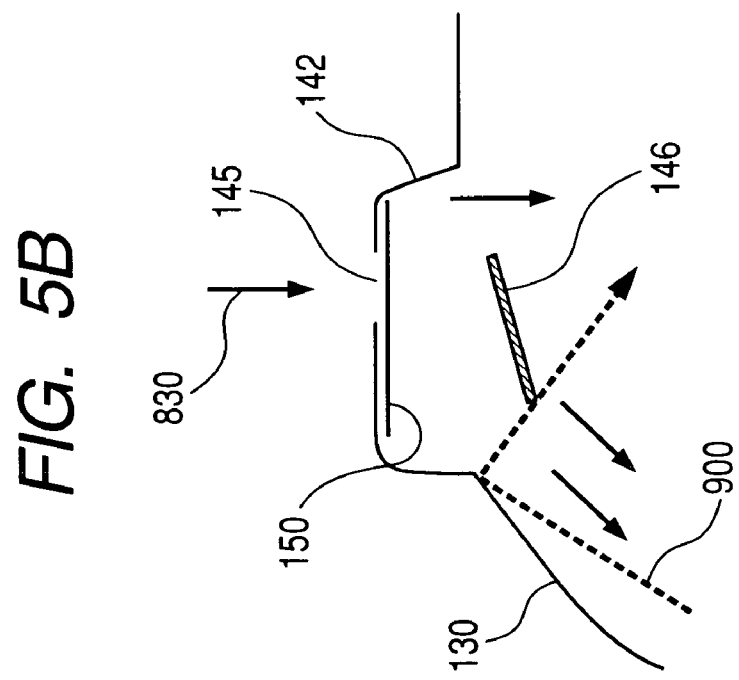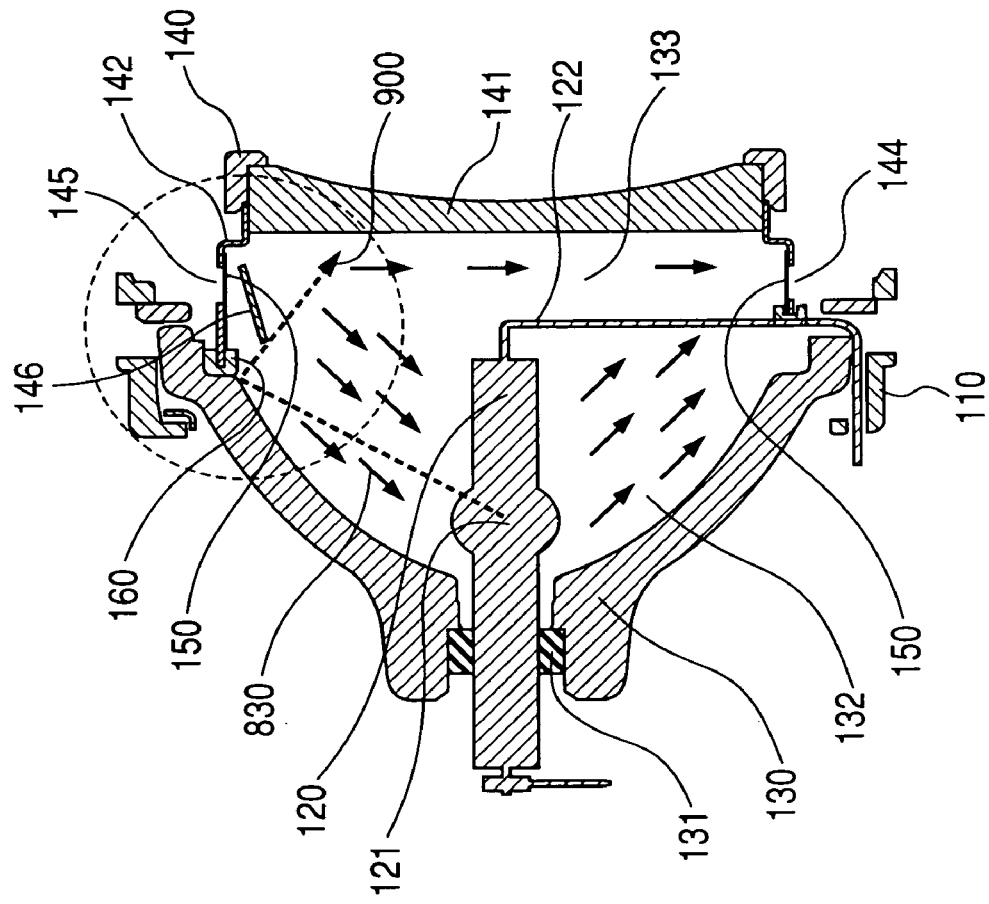

A—A

US 7,293,878 B2

PROJECTOR HAVING AN IMAGE DISPLAY ELEMENT

CLAIM OF PRIORITY

The present application claims priority from Japanese applications serial no. JP2004-015114 filed on Jan. 23, 2004 and serial no. JP2004-247710 filed on Aug. 27, 2004, the contents of which are hereby incorporated by reference into this application.

BACKGROUND OF THE INVENTION

Japanese Patent Laid-open No. 8-262573 discloses the structure in which outside air supplied from an in-flow hole above a lamp house is guided in the direction of a light emitting portion of a light source along an air induction member, directly cools a heat generation portion and flows outside a lamp chamber from a lower out-flow hole.

Further, Japanese Patent Laid-open No. 2002-189247 discloses the structure in which a blower hole for sending cooling air toward the interior of a reflector is formed, and the air direction changing means for changing the direction of cooling air discharged toward the interior of the reflector is provided.

Furthermore, Japanese Patent Laid-open No. 10-27518 discloses the technique in which an air-flow is introduced into a reflector from a duct to cool a lamp.

SUMMARY OF THE INVENTION

In recent projectors, a lamp such as an electric bulb of a high power type has been often used. The lamp tends to be high power resulting from higher brightness whereas miniaturization of the entire device is required, and thus the cooling conditions around the light source device are becoming severe.

In the prior art disclosed in the above-described Japanese Patent Laid-open No. 8-262573, the lowering of the usability of light caused by arranging the air induction member on the light path for light reflected by a reflector has not been recognized sufficiently. In the prior art disclosed in the above-described Japanese Patent Laid-open No. 2002-189247, complicatedness and higher cost of the system caused by arranging an exhaust fan for cooling a discharge lamp were possibly brought forth. In the prior art disclosed in the above-described Japanese Patent Laid-open No. 10-27518, the larger-size of the device caused by providing a duct on the light source device for cooling a light emitting area sufficiently has not been recognized sufficiently.

It is an object of the present invention to solve the aforementioned problems and provide a projector for achieving the enhancement of reliability of a light source device.

There is provided a projector having an image display element for demodulating light on the basis of an image signal, and a projection lens for projecting light emitted from the image display element on a screen. The projector includes a lamp which has a light emission source for emitting light, a reflector which reflects light emitted from the light emission source, a cover glass which covers an emission surface of light from the reflector, a cooling fan disposed outside the reflector, and an air direction changing unit which changes a direction of cooling air caused by the cooling fan, disposed outside an emission light path of light reflected by the reflector and within the space surrounded by the reflector and the cover glass, the cooling air within the space being exhausted outside the projector through the cooling fan.

The present invention is able to achieve the enhancement of reliability of the projector or the light source device.

BRIEF DESCRIPTION OF THE DRAWINGS

FIG. 2 is a perspective view showing the internal structure of the projector according to the first embodiment of the present invention.

FIGS. 5A and 5B are respectively longitudinal sectional views showing the structure of a light source device according to a second embodiment of the present invention.

DETAILED DESCRIPTION OF THE PREFERRED EMBODIMENTS

Figure 1A:
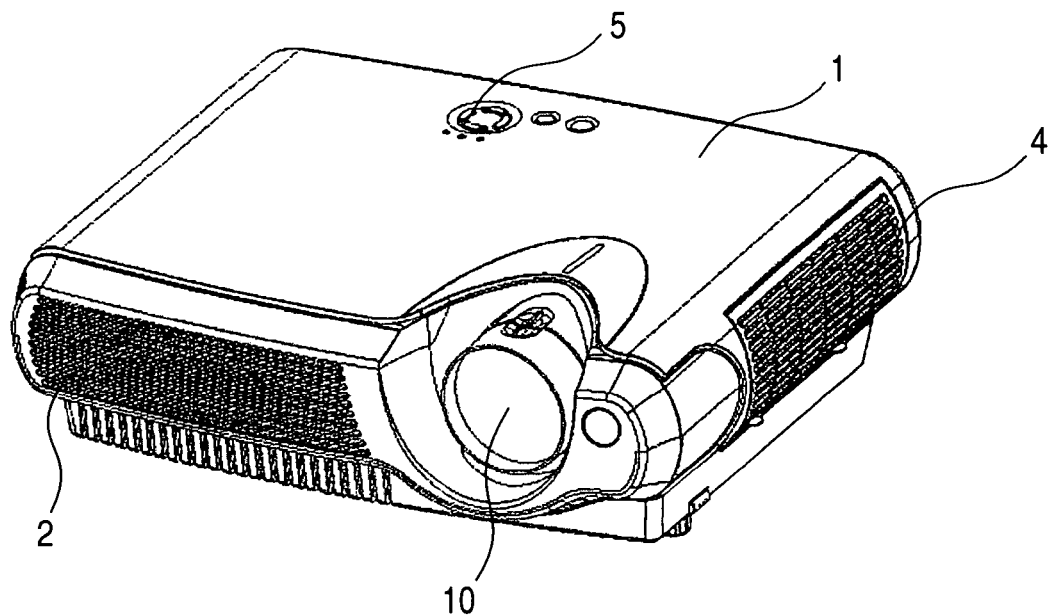
FIGS. 1A and 1B are perspective views showing the front and rear external appearances, respectively, of a projector according to a first embodiment of the present invention.

Preferred embodiments of the present invention will be described hereinafter with reference to the drawings. It is to be noted that in the figures, constituent elements having a common function are indicated by the same reference numerals, and a constituent element that is mentioned once previously will not be described repeatedly in order to avoid complexity.

Figure 1B:
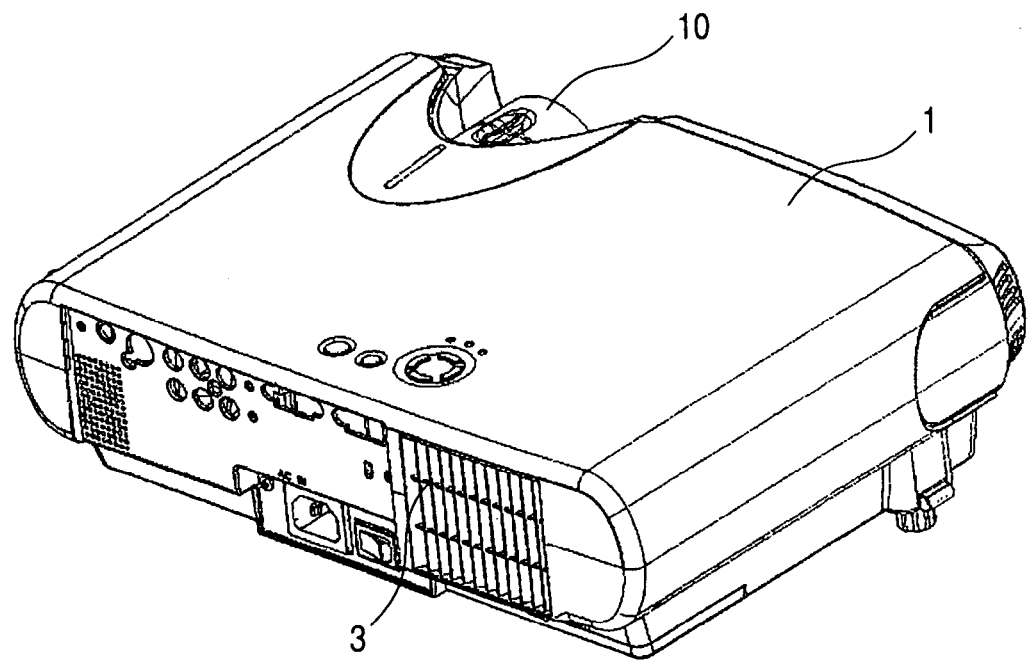

FIGS. 1A and 1B are perspective views showing the external appearance of a projector according to a first embodiment of the present invention; FIG. 1A shows the front of the projector 1, and FIG. 1B shows the rear of the projector.

In FIGS. 1A and 1B, in the projector 1 according to the present invention, an exhaust vent 2 faces in the same direction as a projection lens 10, that is, faces forward, as shown in FIG. 1A, and an intake vent 3 is provided on the rear side, as shown in FIG. 1B. In addition, an operating button 5, a panel intake vent 4, and the like are arranged in the surface of the projector 1 to face the outside thereof.

The projector 1 is actuated by operating the operating button 5 from the outside of the projector. In operation, an image is projected through the projection lens 10 and displayed on a screen or the like not shown.

FIG. 2 is a perspective view showing the internal structure of the projector 1 according to the first embodiment of the present invention shown in FIG. 1.

In FIG. 2, a lamp-cooling duct 200 as lamp-cooling means for cooling a lamp (not shown) as illumination means is provided within the device. The lamp-cooling duct 200 is composed of exhaust ducts 215, 216 provided on one side and a lamp duct 213 provided on the other side with respect to a cooling fan 210 located therebetween. In addition, a duct exhaust vent 211 and a duct intake vent 212 are provided on the respective ends of the lamp-cooling duct 200. It is noted that the duct intake vent 212 and the duct exhaust vent 211 face outside air outside a casing through the intake vent 3 and the exhaust vent 2, respectively.

While not shown due to the lamp duct 213, a light source device (described later) as illumination means is provided under the lamp duct 213. The outline of actual operation of the projector device is that light generated from the lamp as illumination means is demodulated by light valve means not shown within an optical engine section 6, after which it is projected on a screen (not shown) outside the device via the projection lens 10 as projection means, and displayed as an image.

Figure 3B:
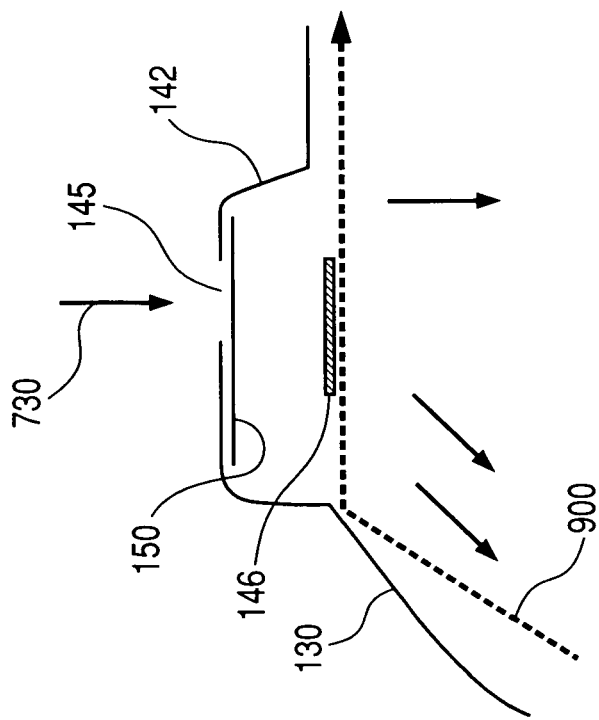
FIGS. 3A and 3B are longitudinal sectional views showing the structure of a light source device according to the first embodiment of the present invention.
Figure 3A:
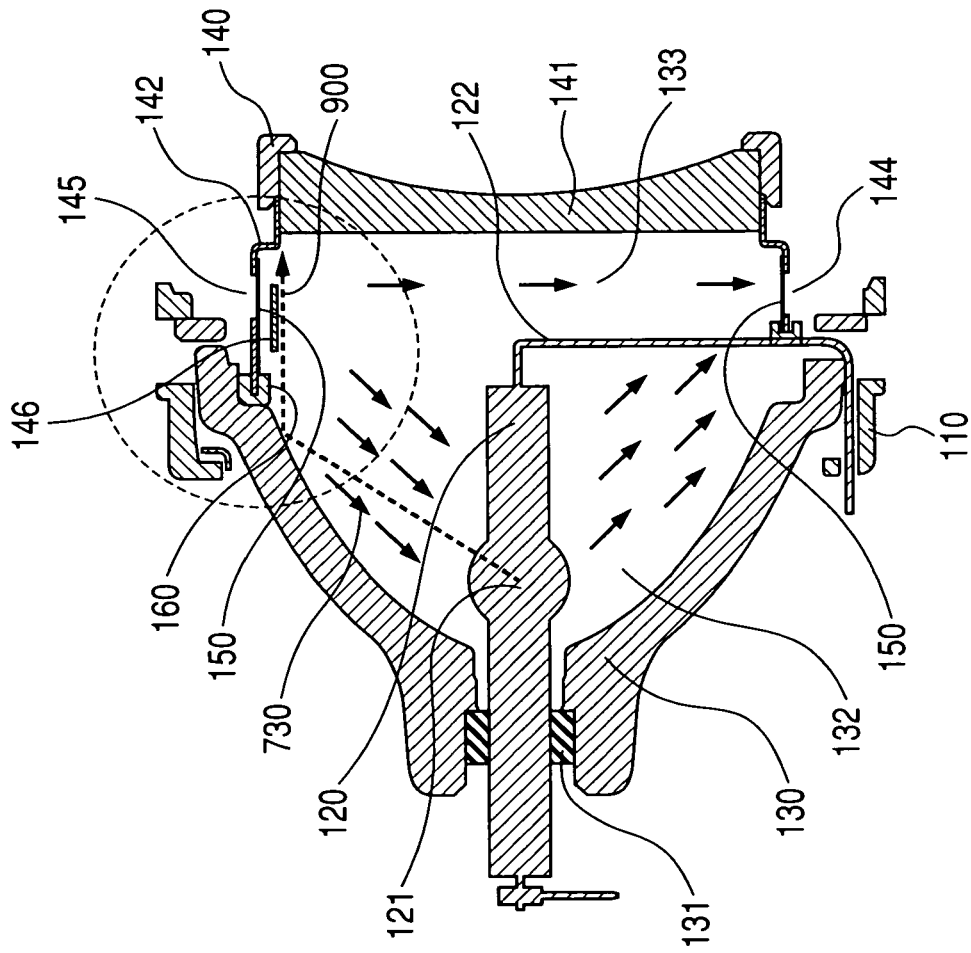
Figure 4:
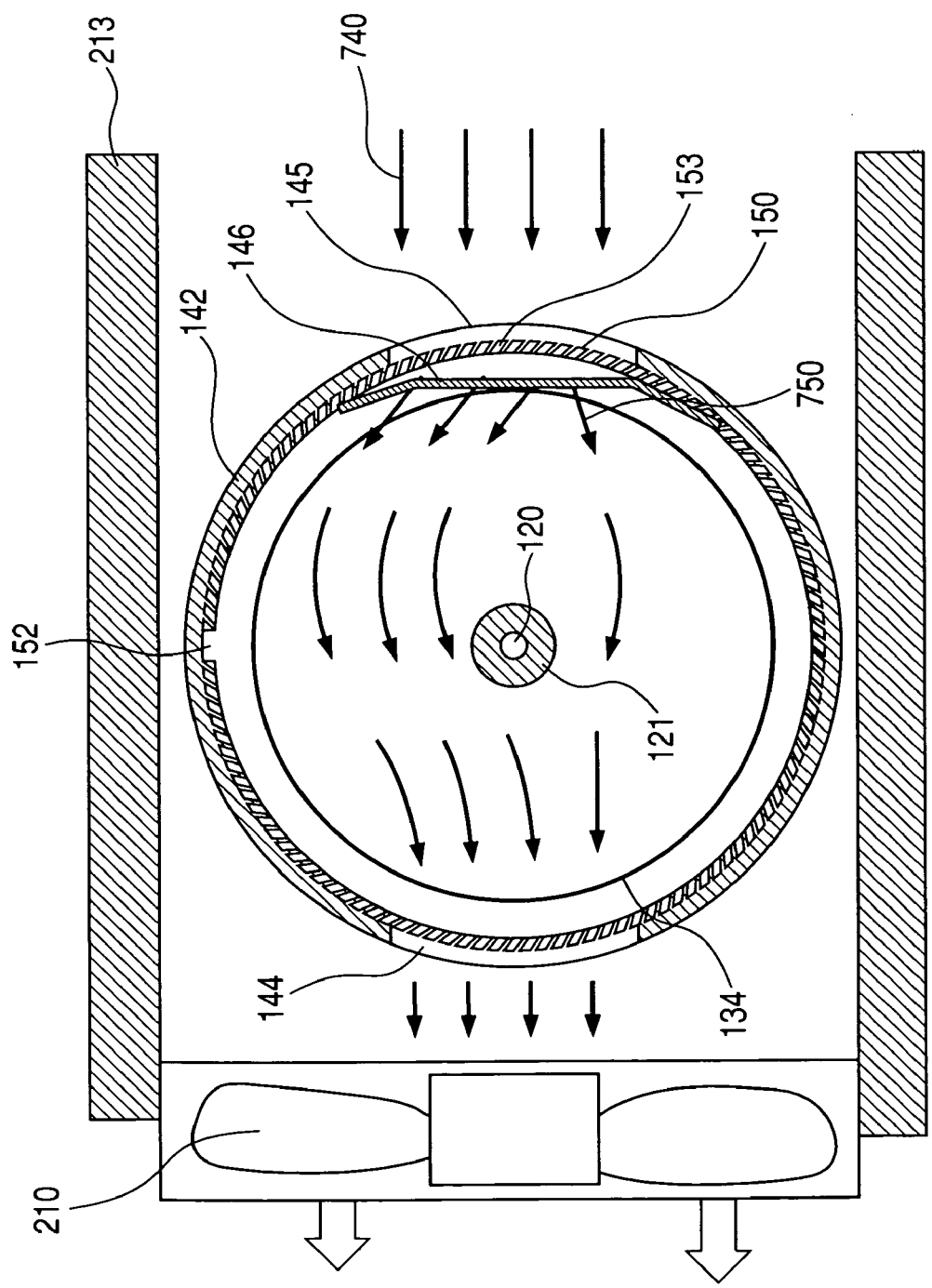
FIG. 4 is a front view showing the structure of the light source device according to the first embodiment 1 of the present invention.

FIGS. 3A, 3B and 4 show the structure of a light source device used for the projector 1 according to the first embodiment of the present invention shown in FIG. 1.

FIG. 3A is a longitudinal sectional view showing the structure of the light source, and FIG. 3B is an enlarged view of an air direction changing plate 146 and its vicinity surrounded by the dotted line in FIG. 3A. FIG. 4 is a front view showing the structure of the light source device.

In FIGS. 3A, 3B and 4, reference numeral 110 denotes a lamp holder; 120 a lamp; 121 a light emitting tube; 122 a lead; 130 a reflector; 131 a cement portion; 132 the inside portion of the interior of a light source device; 133 the outside portion of the interior of a light source device; 134 an outermost periphery of a reflector; 140 a cap; 141 a cover glass also serving as a lens; 142 a connecting cylinder; 144 an exhaust vent; 145 an intake vent; 146 an air direction changing plate; 150 a mesh; 152 a mesh end; 153 a blade portion; 160 a mesh holder; 210 a cooling fan; 213 a lamp duct; and 730, 740, 750 arrows each showing a direction and an amount of cooling air, the amount of cooling air being shown by the number of arrows.

Figure 8A:
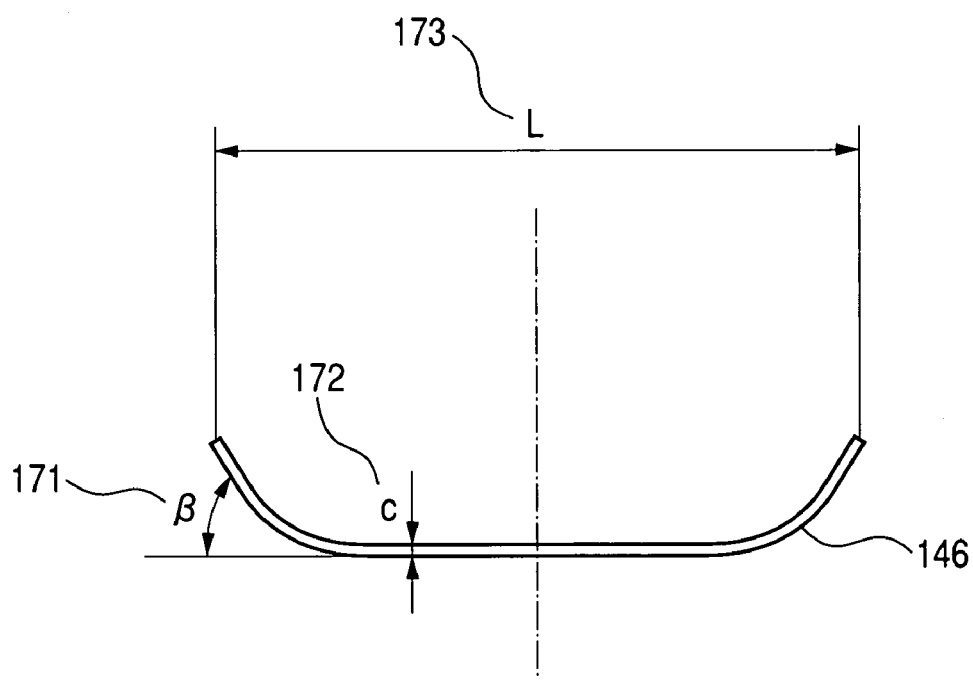
FIGS. 8A and 8B show one example of the structure of an air direction changing plate used in the present invention.
Figure 8B:
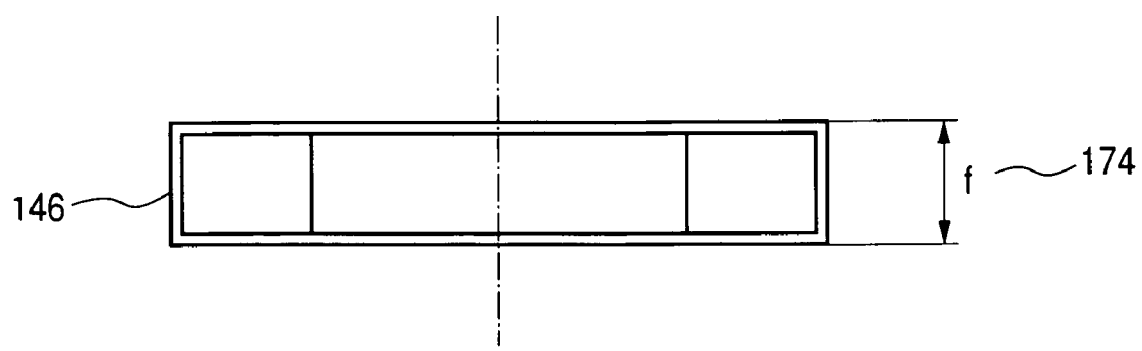

In FIG. 3, the light source device is composed of various parts mounted on the lamp holder 110. That is, the reflector 130, the connecting cylinder 142, the mesh 150 having a number of fine meshes arranged, and the cover glass 141 constitute a closed space so as to surround the lamp 120. This structure can prevent the fragments caused when the lamp bursts up from scattering. Around the lamp are provided the cap 140 having a function to support the entirety, the mesh holder 160 for supporting the connecting cylinder 142, etc. Further, the lamp 120 has the lead 122 for supplying power to the lamp 120. As shown in FIG. 4, the air direction changing plate 146 is welded or adhered to the mesh 150 under the metal portion of the connecting cylinder 142. FIGS. 8A and 8B show the shape of the air direction changing plate 146, FIG. 8A showing a section of the air direction changing plate 146, FIG. 8B showing the front of the air direction changing plate 146. The air direction changing plate 146 shown in FIGS. 8A, 8B is configured, for example, such that a bending angle β 171 is 57 degrees, a plate thickness c 172 is 0.04 mm, a length L 173 is 39 mm, and a width f 174 is 9 mm. The air direction changing plate 146 shown in FIGS. 8A, 8B is bent to be a plate curved from a bending position to an extreme end portion thereof. Bending the air direction changing plate 146 as described above allows cooling air to smoothly enter the interior of the light source device. While in the present embodiment, the air direction changing plate 146 is bent to be the plate curved from a bending position to an extreme end portion thereof, the embodiment is not limited to this configuration. That is, the air direction changing plate 146 may be bent to be a straight plate extending from a bending position to an extreme end portion thereof.

A method for taking air into the light source device shown in FIG. 3 will be described below. In the present embodiment, air is taken in from the duct intake vent 212, and the cooling air that cooled the light source device is exhausted to the outside of a casing from the duct exhaust vent 211 by the cooling fan 210. As described above, the cooling fan 212 is used as an exhaust fan to thereby enhance cooling efficiency. That is, where the cooling fan 212 is used as an intake fan for blowing cooling air against the light emitting tube 121 of the lamp 120 directly, if the air direction changing plate 146 is arranged as shown in FIG. 5, the cooling efficiency is not extremely lowered. However, as shown in FIGS. 3A, 3B and 6, when the air direction changing plate 146 is arranged approximately parallel with the optical axis, the air direction changing plate 146 acts as an obstacle to air so that cooling air may not be taken in efficiently. On the other hand, where the cooling fan 212 is used as the exhaust fan as in the present embodiment, cooling air can be taken in smoothly to enhance cooling efficiency.

Cooling air taken in from the duct intake vent 212 is taken in from the intake vent 145 provided in the connecting cylinder 142. The taken-in cooling air passes through the mesh 150, and then is divided by the air direction changing plate 146 so as to enter the inside portion 132 and the outside portion 133 within the interior of the light source device, that is, the cooling air is guided into the light source device. At this time, the cooling air guided into the light source device flows in the direction and amount shown by arrow 730; the cooling air is guided into the inside portion 132 in an amount greater than that into the outside portion 133 within the light source device. Then, the cooling air that cooled the light emitting tube 121 mainly is exhausted from the exhaust vent 144 to the outside of the reflector 130. With the structure of the present embodiment, since the light emitting tube 121 of the lamp 120 can mainly be cooled, the temperature of the light emitting tube 121 of the lamp 120 can be lowered to about 1000° C., whereas to about 1050° C. without the air direction changing plate 146.

The shape of the reflector 130 and the location of the air direction changing plate 146 in the light source device shown in FIG. 3 will be described. The reflector 130 used in the present embodiment is formed in the shape of a parabola surface. The light emitting tube 121 of the lamp 120 is arranged approximately on a focus of the parabola surface so as to reflect the light reflected from the reflector 130 in approximate parallel with the optical axis. In the present embodiment, as shown in FIG. 4, the air direction changing plate 146 is arranged approximately parallel with the optical axis at a position in contact with the outermost periphery 134 of the reflector in consideration of less influence on the light reflected from the reflector 130 and miniaturization of the projector. Further, the air direction changing plate 146 is made of a material having a high reflectance and high thermal resistance in order to reflect light incident on the air, direction changing plate 146 out of light emitted from the light emitting tube 121 and emit it through the cover glass 141. Since this configuration minimizes deterioration of the usability of light emitted from the light source device, higher brightness can be achieved.

While in the above embodiment, a description has been made of the lamp having a light emitting tube as a light emitting source, the present invention is not limited thereto.

The present invention may be applicable to the case of using an LED light source as the light emitting source. That is, since the air direction changing plate 146 is arranged at such a position as to minimize the deterioration of the usability of light from the reflector, the LED light source that is subjected to high temperatures can be cooled.

Figure 7A:
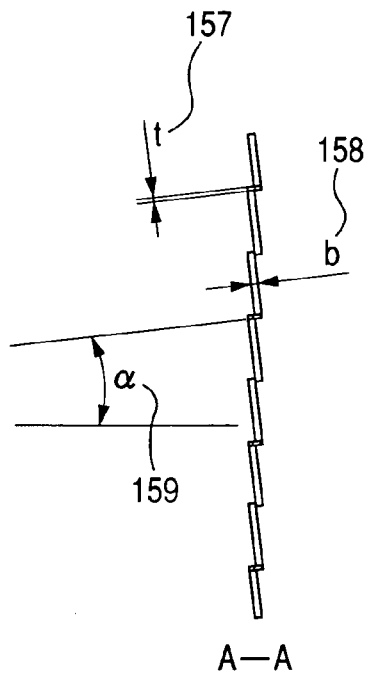
FIGS. 7A to 7C show one example of the structure of the mesh used in the present invention.
Figure 7B:
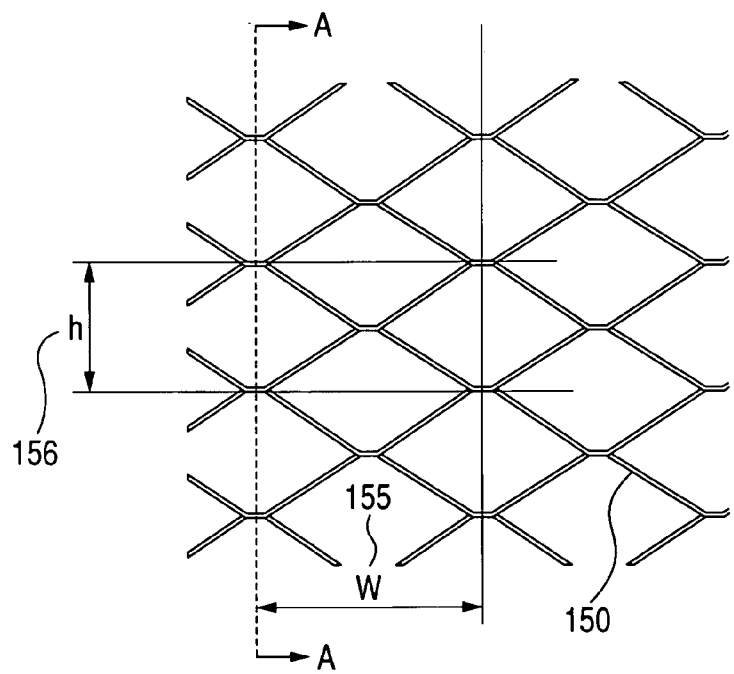
Figure 7C:
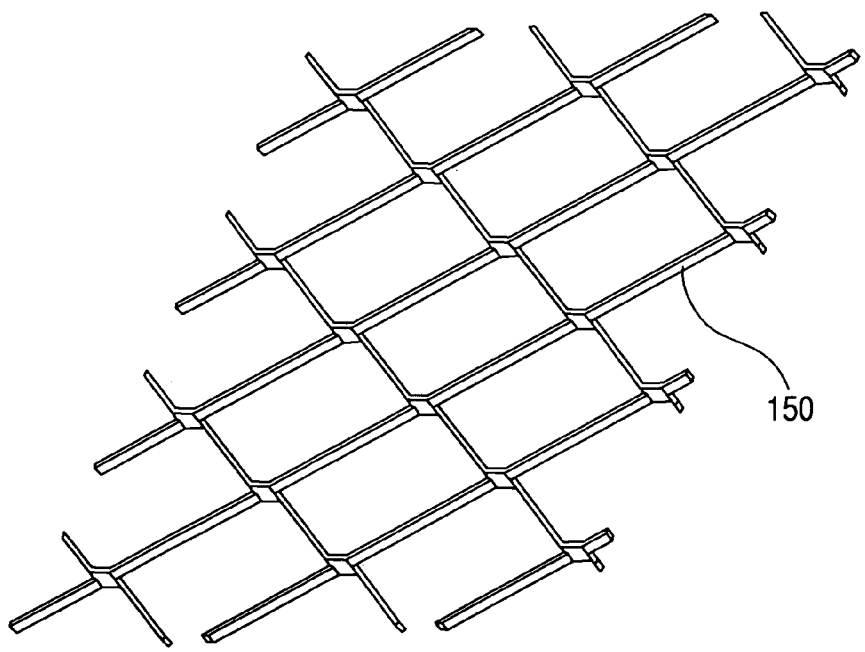

Further, the lamp 120 needs different amounts of cooling energy, in a light emitting operation, between the upper and lower portions within the light source device. Here, in the case where the higher service life of the lamp is taken into consideration, it is necessary to make the temperatures in the vertical directions as even as possible, that is, to allow a greater amount of air to pass through a portion where the temperature becomes high. For example, in the case where the amount of cooling energy required on the upper side is greater, when air is caused to flow evenly between upper and lower portions, the temperature of the upper side of the lamp 120 becomes higher by about 30 degrees than the lower side so that a temperature difference between the upper and lower portions of the lamp 120 increases, thus lowering the service life of the lamp 120. To overcome this disadvantage in the present embodiment, the mesh 150 is configured such that a large number of fine inclined blades are arranged as viewed in an enlarged view, as shown in FIGS. 7A (a cross-sectional view), 7B (a front view), and 7C (an entire perspective view). FIG. 7A is a cross-sectional view taken on line A-A of FIG. 7B. The general structure of the blade portion 153 of the mesh 150 is that for example, a plate thickness t 157 is 0.1 mm, a width b 158 is 0.2 mm, a width W 155 of a fine hole is 1.25 mm, a height h 156 of the fine hole is 0.7 mm, and an angle of inclination a 159 of the plate is 35 degrees. Under the conditions, the air that passes through the mesh 150 is bent in its advancing direction by the blade portion 153 due to the viscosity of air. A flow of air passes through the mesh 150 as in a streamline 750 after bending with respect to a streamline 740, thereby making it possible to control the streamlined direction. In this manner, a flow of air bent by the mesh 150 passes mainly the upper side of the lamp 120, thereby mainly cooling the upper portion of the lamp 120. The present embodiment employs, as the mesh 150, a wire net of the kind generally called expand metal. This expand metal is prepared by putting successively alternate dotted line gaps in a metal plate, and thereafter drawing out both ends of the metal plate to form the mesh. With respect to the whole mesh as described, the expand metal construction as the construction inclined in the direction of plate thickness is a construction in which a number of small blades inclined as viewed from the section side are arranged. When air is applied vertically to the mesh in which a number of inclined fine blades are arranged, the air is subjected to friction with the fine small blades and the viscous resistance of air during it passes between the fine blades. Consequently, the air changes its flowing direction along the direction that the fine blades face. With the aforementioned structure, air is caused to flow toward the upper side of the lamp 120 whereby a temperature difference between the upper and lower portions of the lamp 120 can be made within about 10 degrees. This cooling effect achieves the longer service life of the lamp 120. Further, the mesh 150 shown in FIG. 4 is prepared by a single wire net so that a flow of cooling air when passing through the intake vent 145 or the exhaust vent 144 may be bent on the upper side. The present invention is not limited thereto, but the mesh 150 may be prepared by the aforementioned method using two wire nets and installed internally of the light source device. In this case, one wire net is configured such that cooling air passing through the side of the intake vent 145 is bent on the upper side whereas the other wire net is configured such that cooling air passing through the side of the exhaust vent 144 is bent on the lower side. Installing the two meshes 150 in a manner as described allows the cooling air to pass through the light source device smoothly.

In the present embodiment, the cooling fan 210 is an axial flow fan as shown in FIG. 3. In this manner, since a relatively expensive Sirocco fan is not used herein, the cost can be reduced. Further, the present embodiment is configured such that as shown in FIG. 4, air that cooled the lamp 120 using the cooling fan 210 is exhausted from the exhaust vent 144. In the normal operating condition, a temperature of a deflector and optical parts such as an image display element is lower by one figure than that of the lamp 120. Accordingly, it is possible to employ the structure in which the cooling air that cooled a deflector and optical parts such as an image display element may be used to cool the lamp 120 using a duct or the like.

FIGS. 5A and 5B are longitudinal sectional views showing the structure of a light source device applied to a projector 1 according to a second embodiment of the present invention. FIG. 5A is a longitudinal sectional view showing the structure of a light source device, and FIG. 5B is an enlarged view showing an air direction changing plate 146 and its vicinity surrounded by the dotted line in FIG. 5A. Reference numeral 830 denotes an arrow showing a direction and amount of cooling air, the number of arrows showing the amount of cooling air. Reference numeral 900 denotes an arrow showing light reflecting in the outermost periphery 134 of a reflector out of light emitted from a light emitting tube 121.

This embodiment is different from the first embodiment in that the air direction changing plate 146 is arranged to be inclined with respect to the optical axis, and that an elliptical surface reflector is used as a reflector.

The method for taking outside air into the light source device shown in FIGS. 5A and 5B are similar to that of the first embodiment. However, the direction of the air direction changing plate 146 is changed so that the cooling air 830 introduced into the light source device flows in the direction and amount shown at arrow 830. That is, cooling air is introduced into the inside portion 132 within the interior of the light source device in the amount greater than that into the outside portion 133 within the interior of the light source device, and than that in the first embodiment. With the structure of the present embodiment, a temperature of the light emitting tube 121 of the lamp 120 can be lowered more than that in the first embodiment.

The following describes the shape of the reflector 130 and the location of the air direction changing plate 146 in the light source device shown in FIG. 5. The reflector 130 used in the present embodiment is formed in the shape of an elliptical surface, and the light emitting tube 121 of the lamp 120 is arranged approximately on a first focus of the elliptical surface. Further, the air direction changing plate 146 used in the present embodiment is arranged in consideration of less influence on light reflected from the reflector 130 and miniaturization of the projector. That is, one end close to the inside portion 132 internally of the light source device out of both the ends of the air direction changing plate 146 is arranged at a position in contact with arrow 900; the other is arranged at a position in contact with an approximately parallel straight line with respect to the optical axis from the outermost periphery 134 of the reflector similar to the first embodiment. As with the first embodiment, this structure minimizes deterioration of the usability of light emitted from the light source device, thereby enabling achieving higher brightness.

In the present embodiment, the air direction changing plate 146 is arranged as described above; however, the end close to the interior of the light source device out of both the ends of the air direction changing plate 146 can be also arranged at a position in contact with arrow 900 and approximately parallel to the optical axis. With this arrangement, the air direction changing plate 146 comes close to a cover glass 141, thus enlarging an area of a space formed by an intake vent 145 and the air direction changing plate 146. Thus, the usability of cooling air taken in from the intake vent 145 can be enhanced as compared with the first embodiment.

Figure 6B:
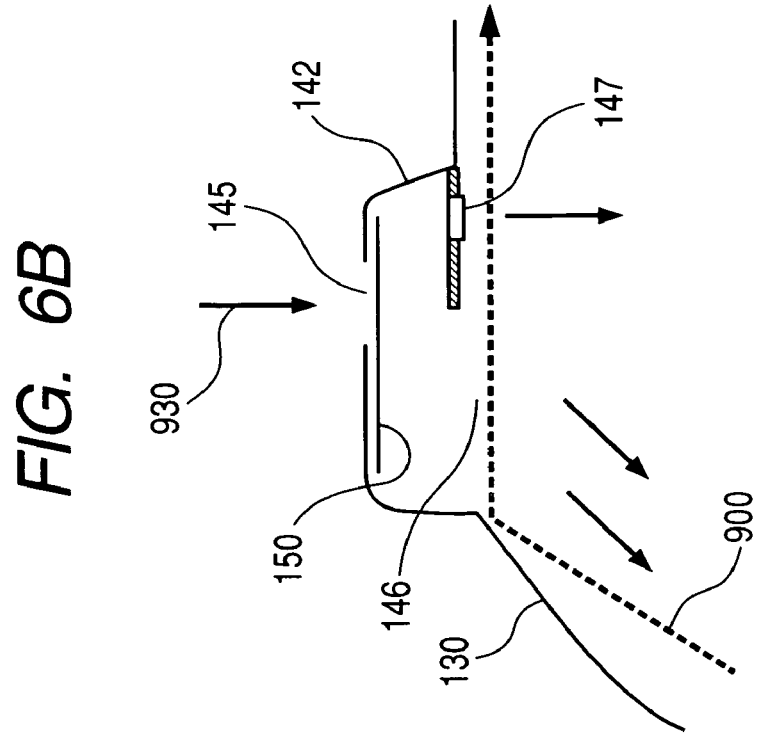
FIGS. 6A and 6B are longitudinal sectional views showing the structure of a light source device according to a third embodiment of the present invention.
Figure 6A:
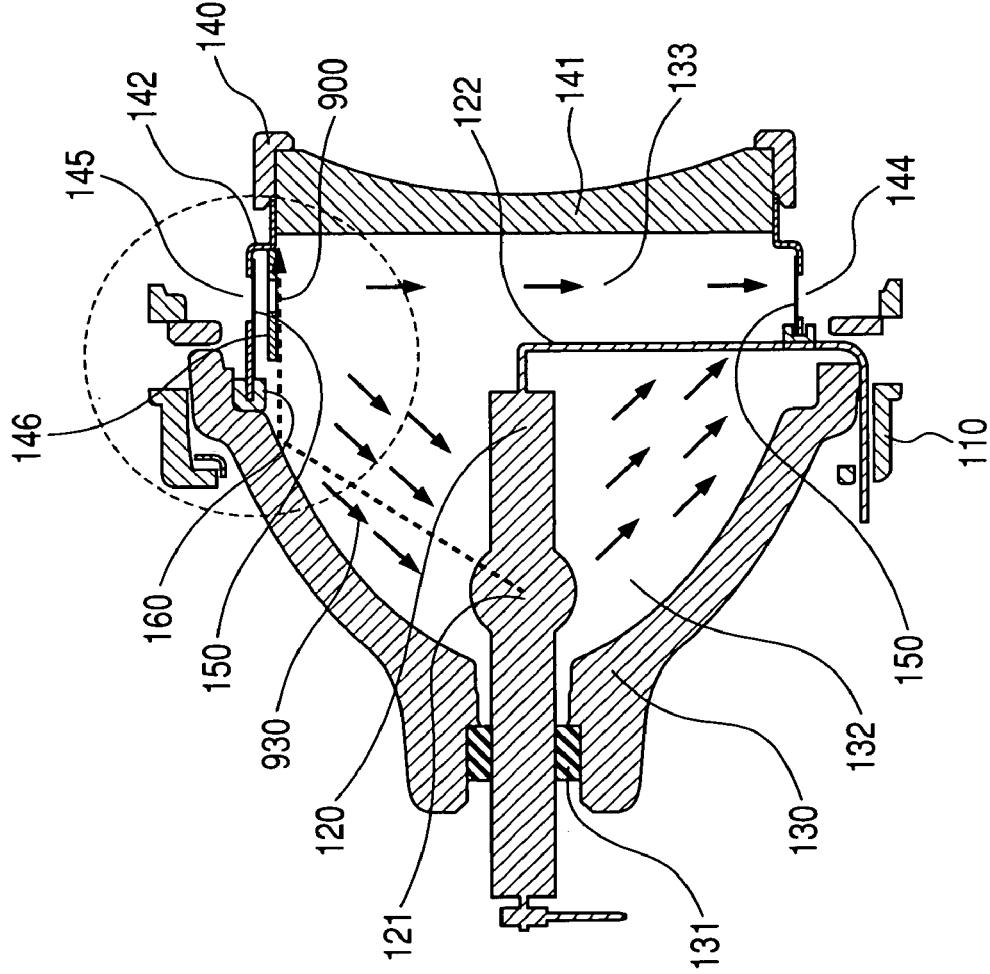

FIGS. 6A and 6B are longitudinal sectional views showing the structure of a light source device applied to a projector 1 according to a third embodiment of the present invention. FIG. 6A is a longitudinal sectional view showing the structure of the light source device, and FIG. 6B is an enlarged view of an air direction changing plate 146 and its vicinity surrounded by the dotted line in FIG. 6A. Reference numeral 930 denotes an arrow showing the direction and amount of cooling air, the amount of cooling air being shown by the number of arrows.

In the first and second embodiments, the air direction changing plate 146 is welded or adhered to the mesh 150 under the metal portion of the connecting cylinder 142. On the other hand, in the present embodiment, the air direction changing plate 146 is welded or adhered directly to the connecting cylinder 142, so that it can firmly be fixed thereto. However, the method for welding or adhering the air direction changing plate 146 is not limited to the above method but welding or adhesion may be done as in the first and second embodiments.

Figure 9A:
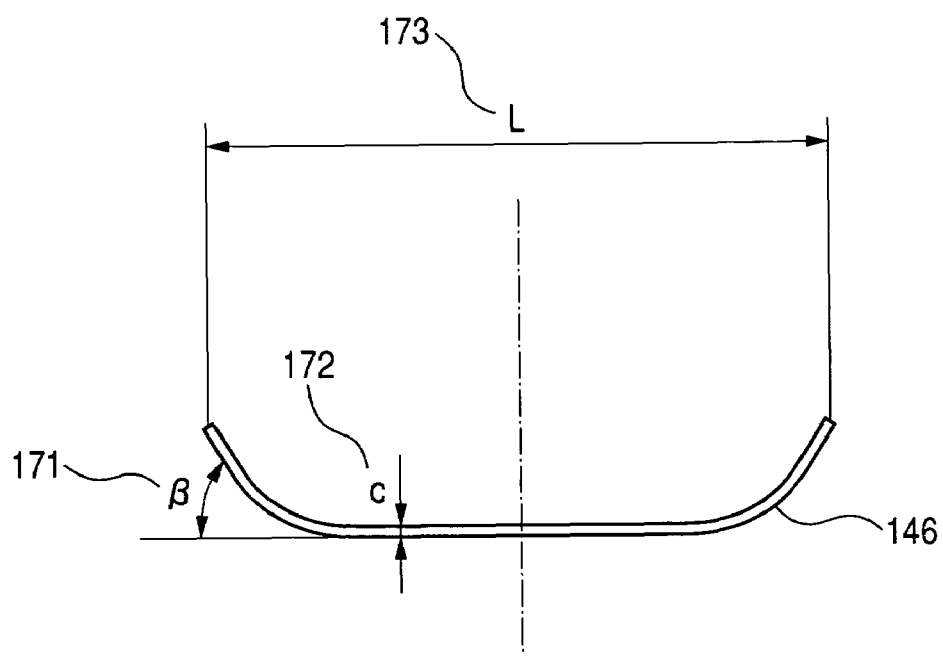
FIGS. 9A and 9B show another example of the structure of an air direction changing plate used in the present invention.
Figure 9B:
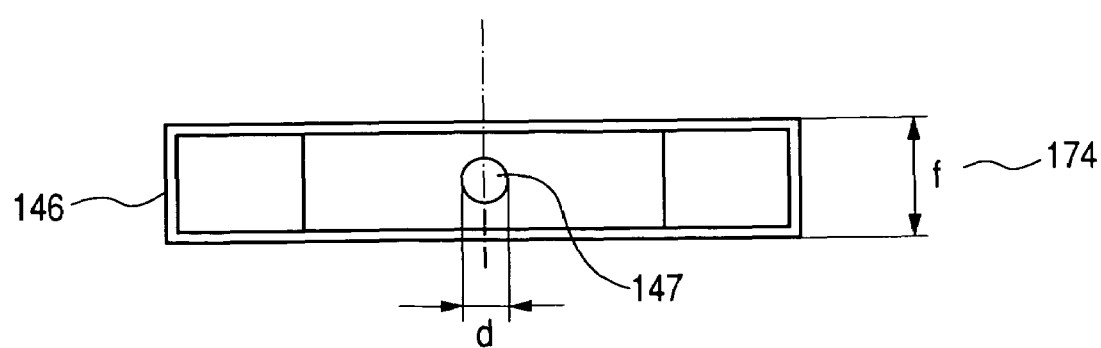

FIGS. 9A and 9B show the shape of the air direction changing plate 146 used in the present embodiment, FIG. 9A showing a section of the air direction changing plate 146, and FIG. 9B showing the front of the air direction changing plate 146. The structure of the air direction changing plate of this embodiment is different from that of the air direction changing plate 146 of FIG. 8 in the provision of a vent 147 therein. In the present embodiment, this vent 147 is of a circle with a diameter d 147 of 4 mm, for example, as shown in FIG. 9B. The vent 147 is not limited to a circle but any shape may be employed. The size of the vent 147 is adjusted to optimize the amount of air flowing to the outside portion 133 within the interior of the light source device. Accordingly, cooling air introduced into the light source device flows in the direction and amount indicated at arrow 930, and the cooling air can be introduced into the inside portion 132 within the interior of the light source device in the amount greater than that into the outside portion 133.

Figure 10:
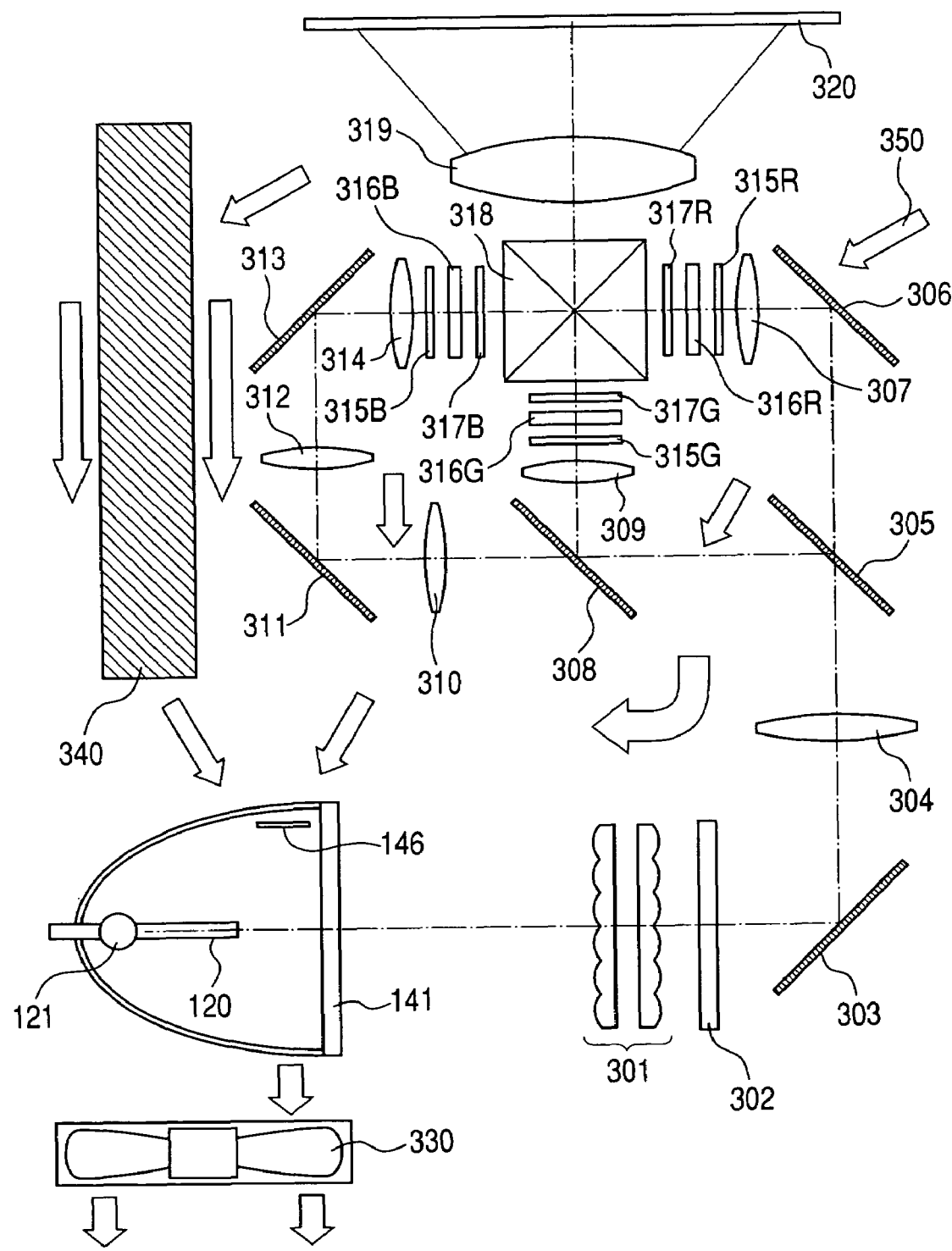
FIG. 10 shows the internal structure of a projector according to a fourth embodiment of the present invention.

FIG. 10 is a general structure view of a projector according to a fourth embodiment of the present invention. The present embodiment employs the light source device used in the first embodiment by way of example. It is needless to say that the light source devices of the second and third embodiments may be used.

In FIG. 10, reference numerals 316R, 316G and 316B denote transmission type liquid crystal panels as image display elements associated with three primary colors R, G, and B, respectively. The liquid crystal panels form images by allowing light from the light source device to be subjected to light intensity modulation according to an image signal by use of an image signal drive circuit not shown. Reference numeral 301 denotes a group of lens arrays composed of two lens arrays; 302 a deflection conversion element for straightening the deflection direction; 303 a mirror; 304 a focusing lens; 305 and 308 dichroic mirrors for color separation; 310 a first relay lens; 312 a second relay lens; 314 a third relay lens; 306, 311 and 313 mirrors; 307 and 309 condenser lens; 315R, 315G and 315B incoming side deflectors; 317R, 317G and 317B outgoing side deflectors; 318 a color synthesizing cross prism; 319 a projection lens; 320 a screen; 330 a cooling fan; 340 a power source circuit; and 350 a direction of cooling air.

Light emitted from the light source device is unified by the lens array group 301, and projected on the liquid crystal panels 316R, 316G and 316B. At this time, a projection image of one cell lens out of the lens array group 301 is superposed to each of the liquid crystal panel 316R for red (R), the liquid crystal panel 316G for green (G), and the liquid crystal panel 316B for blue (B) by way of the focusing lens 304, the condenser lenses 307, 309, the first relay lens 310, the second relay lens 312 and the third relay lens 314.

During the above process, light emitted from the light source device is separated into color lights of three primary colors R, G and B, which are incident on the associated liquid crystal panels 316R, 316G and 316B, respectively. It is noted that the dichroic mirror has the red transmission, green and blue reflecting characteristic, and the dichroic mirror 308 has the green reflection, and blue transmission characteristic.

The liquid crystal panels 316R, 316G and 316B form optical images by allowing an image signal drive circuit not shown together with the incoming and outgoing deflectors 315R, 315G and 315B to control the amount of light transmitting the liquid crystal panels to perform the light intensity modulation for changing grayscale for each pixel.

Further, the optical images incident brightly on the liquid crystal panels 316R, 316G and 316B are color-synthesized by the cross prism 318 and further projected on the screen 320 by the projection lens 319, thus, providing a large screen image.

Next, the method for cooling the interior of the projector will be described with reference to FIG. 10. First, the cooling fan 330 is rotated, whereby cooling air 350 is taken in from an intake vent (not shown) provided in the outer periphery of a casing of the projector, for example. In this case, when dust is mixed into an optical unit composed of a reflector, a liquid crystal panel and the like, image quality is deteriorated; therefore, a fine mesh filter is provided at an intake vent for taking in cooling air. The cooling air 350 taken in from the intake vent flows an air passage formed in order of the liquid crystal panel 316, the incoming side deflector 315, the outgoing side deflector 317, the power source circuit 340, and the interior of the light source device. Then, the cooling air passes through the cooling fan 330, and is exhausted outside the projector from an exhaust vent (not shown) provided in the outer periphery of the casing of the projector. In this manner, these components are cooled in order of increasing heating temperatures. For example, where a light source device of 130 W is used, the liquid crystal panel 316, the incoming side deflector 315 and the outgoing side deflector 317 are heated to about 60° C. to about 70° C., the power source circuit 340 to about 100° C., and the light emitting tube 121 to 1050° C. This enables the single cooling fan 330 to cool the interior of the optical unit and the interior of the light source device. In addition, in the above-described structure, an intake fan is further provided in the vicinity of the intake vent, thereby enhancing the cooling efficiency. Such cooling as described above reduces the number of the cooling fans 330 provided in the projector, so that the projector can be miniaturized.

Alternatively, although not shown, a means, e.g., a wall, that is adapted to separate cooling air is disposed between a power source circuit 340 and an optical unit in order to independently cool the power source circuit 340 and the optical unit. Then, cooling air that cooled the power source circuit 340 and cooling air that cooled the optical unit may be joined so as to cool the interior of the light source device.

With such cooling, both the cooling air that cooled the interior of the light source device and the interior of optical unit can be used, thereby enhancing the cooling efficiency.

Alternatively, although not shown, only the cooling air that cooled the power source circuit 340 may be introduced into the light source device for cooling while the interior of the optical unit is cooled by another cooling structure. In cooling the power source circuit 340 and the interior of the light source device, even if dust should be mixed, this would not directly influence on image quality. Therefore, the filter provided in an intake vent for taking in cooling air may have a coarse mesh. Further, even if no filter is provided therein, no problem occurs. Accordingly, with the above structure, air resistance caused by a filter is so small that the ventilation property of cooling air for cooling the power source circuit 340 and the interior of the light source device is improved, thereby enhancing the cooling efficiency. Further, there is an advantage in that since cooling the interior of the optical unit does not depend on the structure for cooling the power source circuit 340 and the interior of the light source device, designing of the cooling structure suitable for the optical unit is facilitated.

Furthermore, still alternatively, although not shown, the cooling air that cooled the interior of the optical unit may be introduced into the light source device while the power supply circuit 340 is cooled by another cooling structure. With such cooling, the cooling air that cooled the interior of the optical unit heated to as relatively low as about 60 to about 70° C. is used without using the cooling air that might have cooled the power supply circuit 340 heated to as high as about 100° C., thereby enhancing the cooling efficiency.

While in the present embodiment, a description has been made of the case where the transmission type liquid panel is applied as an image display element, it is noted needless to say that the present invention can be also applied to image display elements such as a reflection type liquid crystal panel, a DMD (Digital Micromirror Device) panel and the like.

What is claimed is:

1. A projector having an image display element for modulating light on the basis of an image signal and a projection lens for protecting light emitted from said image display element on a screen, the projector comprising:
    a lamp which has a light emitting source for emitting light;
    a reflector which reflects light emitted from said light emission source;
    a cover glass which covers an emission surface of light from said reflector;
    a cooling fan disposed outside said reflector; and
    an air direction changing unit which changes a direction of cooling air caused by said cooling fan, disposed within a space surrounded by said reflector and said cover glass, and outside an emission light path for light reflected by said reflector;
    wherein cooling air within said space is exhausted outside said projector through said cooling fan;
    wherein said reflector is formed in the shape of an approximate parabola surface;
    wherein said light emitting source is disposed on an approximate focus of said approximate parabola surface; and
    wherein said air direction changing unit is disposed outside a straight line extending approximately parallel with an optical axis from the outermost periphery of said reflector.

2. The projector according to claim 1, wherein
    said air direction changing unit is disposed approximately parallel with an optical axis of light emitted by said light emitting source.

3. The projector according to claim 1, wherein
    said projector includes air guide unit which guides cooling air caused by said cooling fan into the space surrounded by said reflector and said cover glass; and
    said air guide unit guides said cooling air into an upper portion of said space.

4. The projector according to claim 3, wherein
    said air guide unit uses a net having an expand metal structure.

5. The projector according to claim 3, wherein said air guide unit is composed of a net including a plurality of fine blades each arranged at a predetermined angle.

6. A projector having an image display element for modulating light on the basis of an image signal and a projection lens for projecting light emitted from said image display element on a screen, the projector comprising:
    a lamp which has a light emitting source for emitting light;
    a reflector, formed in the shape of an approximately elliptical surface, which reflects light emitted from said light emitting source;
    a cover glass which covers an emission surface of light from said reflector;
    a cooling fan disposed outside said reflector; and
    an air direction changing unit which changes a direction of cooling air caused by said cooling fan, disposed within a space surrounded by said reflector and said cover glass, and outside an emitted light path for light reflected by said reflector; wherein
    said light emitting source is approximately disposed on a first focus of said approximately elliptical surface located within said space;
    one end, close to said light emitting source, of both ends of said air direction changing unit is disposed outside a straight line from the outermost periphery of said reflector toward an approximate second focus, different from the approximate first focus, of said approximately elliptical surface; and
    cooling air within said space is exhausted outside said projector through said cooling fan.

7. The projector according to claim 6, wherein
    said air direction changing unit is disposed approximately parallel with an optical axis of light emitted by said light emitting source.

8. The projector according to claim 6, wherein
    said air direction changing unit is disposed to be inclined with respect to an optical axis of light emitted by said light emitting source.

9. The projector according to claim 6, wherein
    said projector includes air guide unit which guides cooling air caused by said cooling fan into the space surrounded by said reflector and said cover glass; and
    said air guide unit guides said cooling air into an upper portion of said space.

10. The projector according to claim 9, wherein
    said air guide unit is composed of a net including a plurality of fine blades each arranged at a predetermined angle.

11. The projector according to claim 9, wherein
    said air guide unit uses a net having an expand metal structure.

* * * * *